United States Patent [19]

Johanson

[11] Patent Number: 5,007,484

[45] Date of Patent: Apr. 16, 1991

[54] METHOD AND APPARATUS FOR CHANGING CULTIVATOR PLOW BLADES

[76] Inventor: Greg N. Johanson, R.R. 2, Box 122, Elmore, Minn. 56027

[21] Appl. No.: 428,988

[22] Filed: Oct. 30, 1989

[51] Int. Cl.$^5$ ............................................. A01B 39/22
[52] U.S. Cl. ......................................... 172/1; 172/762; 172/708; 172/750
[58] Field of Search ............... 172/749, 750, 751, 753, 172/762, 719, 721, 708; 403/328, 109, 377; 37/142 A

[56] References Cited

U.S. PATENT DOCUMENTS

| | | | |
|---|---|---|---|
| 1,132,335 | 3/1915 | Graves | 172/751 X |
| 1,250,472 | 12/1917 | Kirkpatrick | 172/750 X |
| 2,595,353 | 5/1952 | Graham | 172/762 X |
| 2,877,061 | 3/1959 | Blackwood | 172/753 X |
| 3,061,021 | 10/1962 | Shader | 172/750 |
| 3,220,489 | 11/1965 | Repka | 172/750 |
| 3,563,318 | 2/1971 | Eberhardt et al. | 172/750 |
| 4,611,418 | 9/1986 | Launder | 172/750 X |

FOREIGN PATENT DOCUMENTS

| | | | |
|---|---|---|---|
| 605679 | 9/1960 | Canada | 37/142 A |
| 635567 | 1/1962 | Canada | 37/142 A |

Primary Examiner—Randolph A. Reese
Assistant Examiner—Jeffrey L. Thompson
Attorney, Agent, or Firm—Henry C. Kovar

[57] ABSTRACT

A soil cultivator has a new cultivator shank and a new plow blade which has a fixed lock structure. The plow blade is held to the shank by a movable snap action lock mechanism in a working end of the shank. A new method of quickly changing plow blades with a snap action lock in a cultivator shank is also provided.

11 Claims, 2 Drawing Sheets

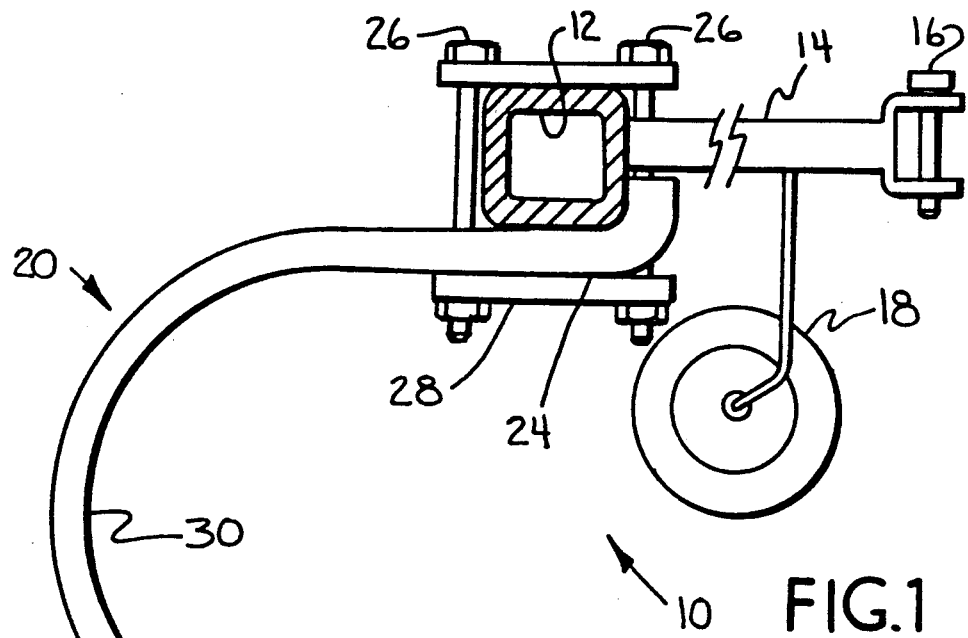
FIG.1
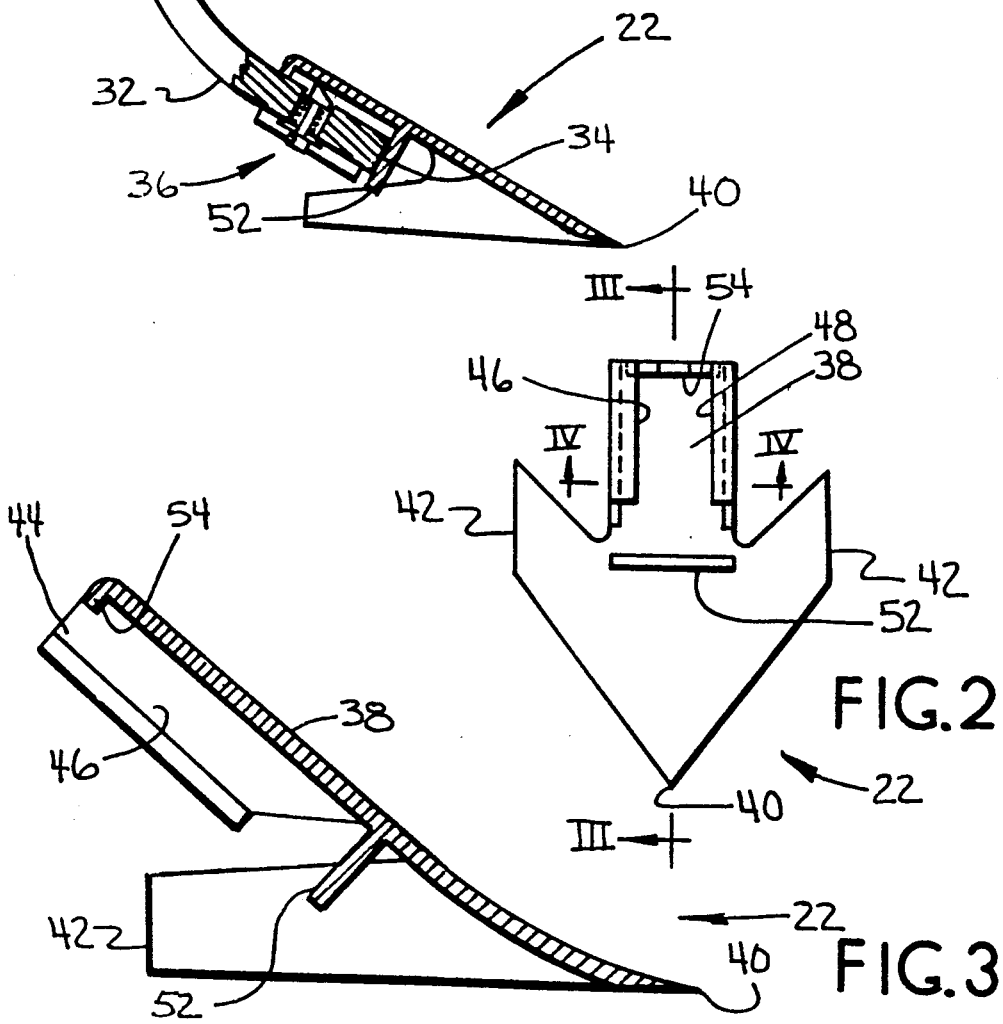
FIG.2
FIG.3

METHOD AND APPARATUS FOR CHANGING CULTIVATOR PLOW BLADES

BACKGROUND OF THE INVENTION

1. Field of the Invention

This invention pertains to a new and improved cultivator shank and plow blade having snap connection structure therebetween enabling easy and rapid changing of blades upon the shank; the invention also includes a new method of easily changing cultivator blades.

2. The Prior Art

Existing plow blades (or shovels or sweeps as they sometimes are called) are conventionally held on and retained to cultivator shanks by nuts and bolts. The nuts and bolts are difficult to access and often require air tools and/or a torch be utilized to change plow blades. Replacement of plow blades is necessary for replacement of worn out or destroyed blades, or changing of blades for a different soil working endeavor. It takes considerable time to change the existing plow blades and in as much as each cultivator may have 20, 30, 40 or more blades, it becomes a lengthy project to change plow blades.

OBJECT OF THE INVENTION

It is an object of this invention to provide a new combination of cultivator shank and plow blades enabling snap-action quick-changing of the plow blade.

It is an object of this invention to provide a new cultivator shank having snap-action structure for retention of a discrete plow blade.

It is an object of this invention to provide a new plow blade which is quickly securable to and releasable from a cultivator shank.

It is an object of this invention to provide a new method of securing and replacing plow blades on a cultivator shank.

SUMMARY OF THE INVENTION

According to the principles of this invention, a combination of a cultivator shank and a plow blade has a resiliently biased movable blade lock in a work end of the shank with the blade having a back side slide clip that slip fits upon the shank, a blade stop is on an underside of the blade and abutted against the shank, fixed lock structure on the blade is held by the movable lock, and retractor means are provided for retracting the movable lock for removal of the blade.

A cultivator shank has movable lock structure, biasing structure operative to move the lock structure outward, and retractor structure for retracting the lock structure.

A plow blade has a longitudinal plate with a soil cutting leading edge, a downward projecting blade stop, a slip fit clip on the blade back side for slipping on a cultivator shank, and lock structure spaced rearward of the blade stop.

A method of securing and changing plow blades on a cultivator shank has the steps of sliding a back end of the blade onto a work end of the shank, abutting a blade stop against the shank work end, locking the blade back end with a resilient snap-action lock, retracting the lock to unlock and remove the blade, and placing a new blade on the shank by repeating the sliding, abutting and locking steps.

BRIEF DESCRIPTION OF THE DRAWINGS

FIG. 1 is an elevational cross-sectional view of a cultivator having the preferred embodiment of the shank and blade of the present invention;

FIG. 2 is a plan view of the bottom side of the blade of FIG. 1;

FIG. 3 is an elevational sectional view through lines 111—111 of FIG. 2;

DESCRIPTION OF THE PREFERRED EMBODIMENT

Figure 4:
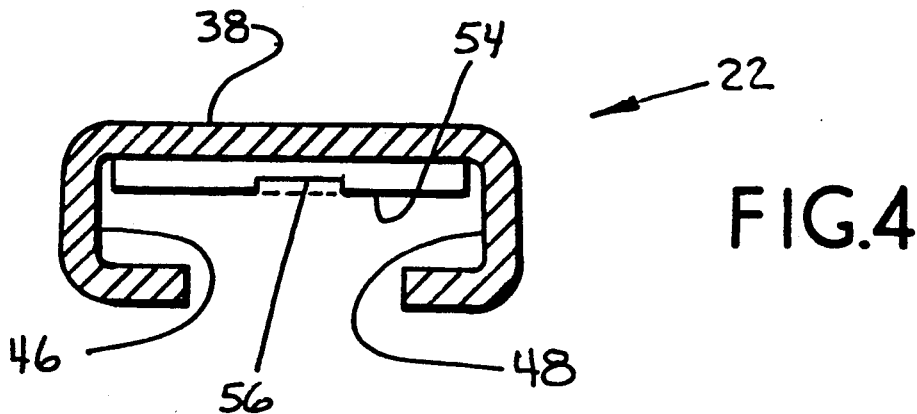
FIG. 4 is a sectional view through lines IV—IV of FIG. 2.

According to the principles of this invention, the preferred embodiment of a soil cultivator is shown in FIG. 1 and generally indicated by the numeral 10. The cultivator 10 has a generally transverse drawbar 12, a tongue 14, a hitch 16, and some kind of support 18 such as one or more wheels to support the cultivator 10.

An important feature of this invention is the new and improved combination of a new cultivator shank and cultivator plow blade, generally indicated by the numbers 20 and 22 respectively.

The shank 20 is an elongate length of metal, the illustrated shank 20 is generally C-shaped and has a fastening end 24 clamped and fastened to the drawbar 12 by bolts 26 and plates 28. The illustrated shank 20 has a central spring section 30. The outer end of the shank 20 is a working end 32 which has a forward facing abuttment 34 and which carries a snap-action movable blade lock generally indicated by the numeral 36.

Mounted on the shank working end 32 is the discrete and new plow blade 22 which is shown in detail in FIGS. 2, 3 and 4. The blade 22 has a central longitudinal length 38 having a relatively sharp leading edge 40 for cutting soil. The blade 22 may have sweeps 42 which are appropriate for the intended agricultural purpose. As shown, the back side of the blade 22 has an enclosing clip structure 44 formed by a pair of opposing elongate C-shaped sections 46, 48, the open sides of which face each other as best seen in FIG. 4. The clip section 44 is configured and sized to slip fit upon the shank working end 32. At the front of the downward facing clip section 44 and to the rear of the front edge 40 is a downward projecting blade stop 52 which has a width at least as wide and preferably wider than the width of the clip section 44. The stop 52 has height and width dimensions which are larger than the height and width of the shank working end 32 and the entire shank abuttment 34 is covered. At the back of the clip structure 44 is a downward facing fixed lock flange 54 which also slip fits upon the shank working end 32. The lock flange 54 spans the entire width of the clip structure 44 and may have an optional central notch 56 for purposes to be explained.

Figure 5:
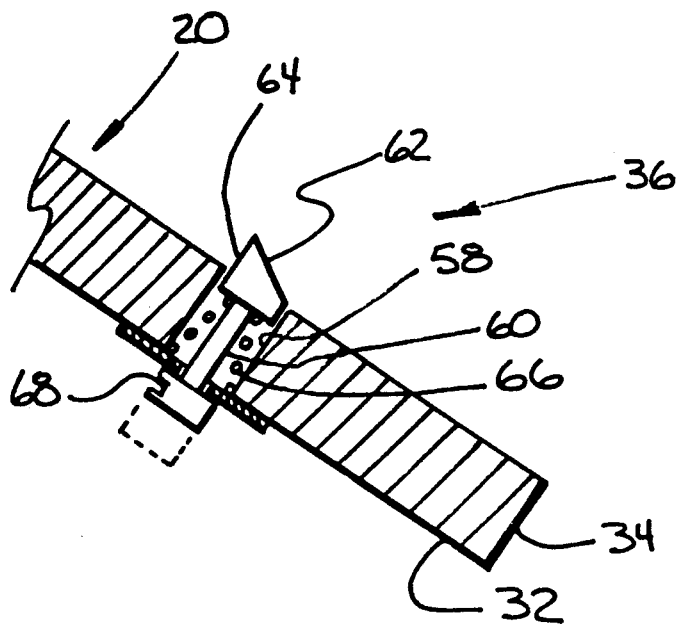
FIG. 5 is an elevational sectional side view of the movable lock in FIG 1.

The preferred movable blade lock structure 36, shown in detail in FIG. 5, has an aperture 58 through the working end 32. Within the aperture is a movable detent shaft 60. On the upper end of the detent shaft 60 is an actuator cam 62 and a movable normal lock abuttment 64. Within the aperture is a lock spring 66 that resiliently biases the lock abuttment 64 outward from the shank working end 32. At the bottom of the detent shaft 60 is a rearward facing retractor slot 68 for enabling retraction of the lock abuttment 64 by a screwdriver or appropriate pry tool. The lock abuttment 64 and cam 62 are keyed to the shank 20 so that the abuttment 64 always faces rearward and the cam 62 always faces forward.

In operation and use of the movable lock structure 36 and in the practice of the method of this invention, the blade 22 is simply pushed upon the shank working end 32 whereupon the lock flange 54 engages the cam 62 and pushes the lock abuttment 64 down against the spring 66. When the lock flange 54 is pushed past the abuttment 64, the abuttment 64 resiliently snaps upward and outward behind the lock flange 54 and the blade 22 is locked to the shank 20. During plowing, the imperforate central length 38 keeps soil out of the lock mechanism 36. When it is desired to change the plow blade 22 for whatever reason, a pry tool is placed in the retractor slot 68, the lock abuttment 64 is pryed downward into the shank 20 and the existing plow blade 22 is simply pulled off the front of the shank working end 32. A new plow blade 22 is then simply pushed back on and locked to the shank working end 32.

Figure 6:
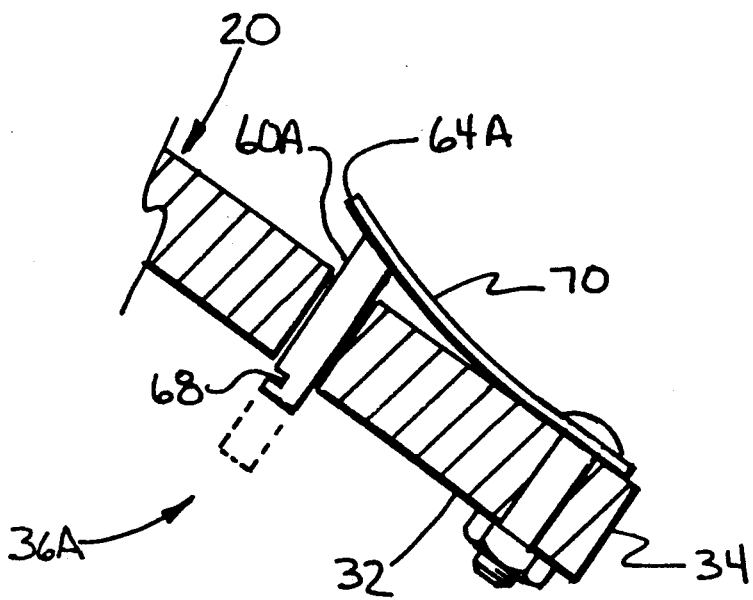
FIG. 6 is an elevational sectional side view of an alternative preferred movable lock structure for the cultivator of FIG. 1.

FIG. 6 illustrates an optional preferred movable locking structure 36A wherein a sheet metal spring clip 70 is attached to the shank working end 32 and a detent shaft 60A having a retractor slot 68 is connected to the spring clip 70 and extends through the shank 20. This lock mechanism 36A works essentially the same as the FIG. 5 mechanism 36, and the optional notch 56 may be provided to slip over the spring clip 70 and its fastener(s). The back end of the spring clip 70 forms the movable lock abuttment 64A.

n the use of the shank 20 and plow blade 22, all forces delivered to the blade 22 are transmitted directly from the shank abuttment 34 to the blade stop 52 and the lock mechanisms 36, 36A are not loaded during plowing.

This new combination of shank 20, lock 36, 36A and blade 22, new shank 20, new blade 22, and new method are quick, low cost, strong and of great value to the farmer needing to rapidly install and change cultivator shovels.

Many other advantages, features and additional objects of the present invention will become manifest to those versed In the art upon making reference to the detailed description and accompanying drawings in which the preferred embodiment incorporating the principles of the present invention is set forth and shown by way of illustrative example.

Although other advantages may be found and realized and various modifications may be suggested by those versed in the art, be it understood that I embody, within the scope of the patent warranted hereon, all such embodiments as reasonably and properly come within the scope of my contribution to the art.

I claim as my invention:

1. The improved cultivator shank and plow blade comprising
   (a) an elongate cultivator shank having a fastening end and a work end;
   (b) resiliently biased movable blade lock means mounted to and biased outwardly of said shank work end;
   (c) a plow blade having a leading edge for cutting soil and a slide clip on a back side of the blade, said slide clip being a slip fit upon the shank work end;
   (d) a blade stop on an underside of the blade, said stop being completely in front of said slide clip and being abuttable against a forward facing outermost end abutment on the shank work end for positioning the blade and for transfer of working forces from the shank through the abutment and to the blade,
   (e) fixed lock means on said blade back side for being engaged by said movable lock means, for retention of the blade to the shank;
   (f) retractor means for retracting said movable lock means for removal of the blade from the shank; and
   (g) an imperforate section of the plow blade which completely covers said lock means.

2. The shank and blade of claim 1, in which said abutment and said blade stop are completely in front of and spaced forward of said movable lock means.

3. The shank and blade of claim 2, in which said blade stop is at least as large as a cross section of said shank, and in which the blade stop covers the entire working end abutment of the shank.

4. The shank and blade of claim 3, in which said retractor means is under said shank and spaced rearward of said blade stop.

5. An improved cultivator shank having
   (a) an elongate length of spring having fastening means on one end for fastening of the shank to a cultivator;
   (b) movable lock means on a second and working end of the shank for locking a plow blade thereon;
   (c) resilient biasing means for biasing said lock means outward from said shank;
   (d) retraction means for retracting said lock means inward toward said shank working end;
   (e) a forwardmost facing working end outer abutment providing means for engaging a rearward facing blade stop of the plow blade, said lock means being spaced rearward of said abutment; and in which
   (f) said lock means is on an upper side of said shank, and is movable outward and inward along a path which is normal to said working end, 6. A plow blade comprising
   (a) a longitudinal plate having a soil cutting leading edge;
   (b) a downward projecting blade stop on an underside of the plate providing means for receiving a portion of the working forces from an abutment on a cultivator shank, said stop being spaced rearward of said leading edge;
   (c) clip means on a back side of the plate separate from and spaced rearwardly of said blade stop for slip fit upon the leading end of a cultivator shank; and
   (d) downward facing lock means on said plate back side and spaced rearward of said blade stop, for engaging a blade lock on the cultivator shank and for locking the blade upon the shank.

7. The plow blade of claim 6, in which said blade stop is forward of said clip means.

8. The plow blade of claim 7, in which said blade stop is wider than said clip means.

9. The plow blade of claim 6, in which said lock means is a flange extending across the complete width of the clip means.

10. The plow blade of claim 6, in which said clip means comprises a pair of opposed generally C-shaped flanges positioned in between the lock means and the blade stop.

11. An improved method of securing and changing plow blades on a cultivator shank comprising the steps of
  (a) sliding a back end of a plow blade upon, and at least partially around, a work end of a cultivator shank;
  (b) abutting a rearward facing blade stop on the blade against a forward facing abutment on an outermost end of the shank work end;
  (c) locking the blade back end to the shank with a resilient snap-action lock;
  (d) retracting the snap-action lock to unlock the blade and removing the blade from the shank;
  (e) placing a new plow blade upon the shank by repeating steps (a), (b) and (c);
  (f) completely covering the snap-action lock with an imperforate central section of the plow blade; and
  (g) transferring most plowing work load forces from the shank through the abutment and the blade stop to the plow blade.

* * * * *